Patented Aug. 31, 1926.

1,598,470

UNITED STATES PATENT OFFICE.

CYRUS FIELD WILLARD, OF SAN DIEGO, CALIFORNIA.

PROCESS FOR DEVULCANIZING VULCANIZED RUBBER AND THE PRODUCTS THEREOF.

No Drawing.  Application filed January 4, 1926. Serial No. 79,266.

The present invention relates to improvements in processes for devulcanizing rubber in the presence of the fiber where the fiber is so treated and utilized as to increase the yield, without destroying the fiber, as is usually done in the ordinary alkali process of "reclaiming" rubber, and producing a better article of devulcanized rubber thereby, and the product obtained by such steps.

In earlier applications for which U. S. Patents Nos. 1,322,077, 1,322,151 and 1,322,152 were issued to me on Nov. 18, 1919, I disclosed processes whereby devulcanization was accomplished by the use of an emulsoid colloid solution, acting as a substitute adsorption medium in which the combined sulfur of vulcanization was adsorbed and removed from the rubber, thus bringing about a true devulcanization.

Prior to the time when application Ser. No. 223,208 was filed on March 18, 1918, and on which U. S. Patent No. 1,322,152 was afterwards issued, I had used the herein described process experimentally, but as it was not used at the time nor has it been in use or on sale up to this time, it did not seem necessary to file an application for patent on the process. Since the progress of the art is beginning to reach the point where such a process will be of value, and in order to preserve my priority of the invention of this process, it is deemed advisable to make such application now, and to specify the manner in which the process may be used in connection with the processes for which U. S. patents have already been issued to me for the purpose of preserving and utilizing the fiber in rubber scrap, and combining it with the devulcanized rubber as aforesaid, thus increasing the yield and making a devulcanized rubber of superior quality.

The fiber contained in waste vulcanized rubber scrap, like tires, rubber boots and shoes, hose, etc., can be treated and utilized by so treating it that it may be turned into a colloidal cellulose and left combined in the rubber devulcanized by my process (instead of removing it as heretofore done) in a condition different than its original state.

This cotton fiber in vulcanized rubber scrap is converted into a colloidal cellulose, or hydro-cellulose which is tenacious, insoluble in water and structureless, without separating the rubber from the fiber, and the rubber is devulcanized by processes covered by U. S. patents first cited, but this devulcanization by my process may be done before the ground cotton fiber is turned into the desired form of cellulose. When this combination of rubber (devulcanized as above cited by my process) and cellulose with a vulcanizing agent, accelerators, pigments, etc., added to the combination, is sheeted out and vulcanized, the product will be superior for many purposes to new rubber, or new rubber products, because the colloidal or hydro-cellulose is tenacious and elastic and renders the rubber product durable and stable, lessens its specific gravity as compared with new rubber, increases its tensile strength and lessens the cost of production. It would seem that hard rubber made in this way will endure a much higher degree of heat than ordinary rubber, and will better resist the action of oils, acids and alkalies than ordinary hard rubber, and it can be manufactured at much less cost than that made in the usual way, because all of the fiber hitherto wasted is used to improve the material.

My process in treating this rubber scrap is as follows:

The scrap, such as tires, boots, shoes, hose, etc., is ground in the usual manner and put through my process of devulcanizing by the use of an emulsoid colloid solution with a sulfur solvent. (See Patents Nos. 1,322,077; 1,322,151 and 1,322,152, issued to me Nov. 18, 1919.) After it has gone through the first stage of this process, that is after the rubber is devulcanized with an emulsoid colloid solution, the material is treated with 10% to 20% caustic soda or sodium hydroxide (NaOH) and allowed to stand in a cool place from three to five hours. It is then placed in a digester or receptacle that can be closed securely, and carbon disulfide ($CS_2$) is added in the proportion of about one pound of $CS_2$ to each ten pounds of dry rubber scrap and the digester is then securely closed. It is allowed to remain in the digester from three to five hours during which time certain chemical reactions occur, while the material in the digester is stirred in such a manner as to agitate and stir the mass inside, or any other means of operation used to bring about a combination of the sodium hydroxide and carbon disulfide with the cellulose of the cotton fiber, and thus produces a colloidal cellulose. When this is done the rubber and fiber is converted into a sticky and cohesive mass, and this may be a one-step or two-step process as desired. Water in quantity equal in weight to the original dry rubber is added to the digester and the agitation is continued, the water mixing with the cellulose and distending it to make a hydrocellulose. The mass in the digester is then heated by carefully raising the steam pressure in the closed vessel to about 50 lbs. or even up to 100 lbs. according to the stock to be treated and this pressure is kept up for about 5 hours or longer, varying with the scrap which is being treated, and during this time the mass should be agitated and stirred continuously. The rubber with the treated fiber is afterwards taken from the digester, dried and sheeted out in a rubber mill. When the rubber has been previously devulcanized by my devulcanizing process, it is not necessary to use the high pressure and long hours of treatment that others have used to accomplish the conversion of the cotton fiber into a colloidal cellulose, and in this respect my process exhibits a distinct advance and advantage over others for producing a colloidal cellulose, inasmuch as it shortens the time and expense of treatment, and thus enables a greater tonnage to be handled per day, as well as securing a greater yield. The heating causes the cellulose to become insoluble in water and any of the combined sulfur, which has escaped removal by my devulcanizing process, tends to become united with the carbon disulphide.

In this process the rubber and elastic, tenacious and colloidal cellulose unite and intermingle when sheeted out so as to appear as all rubber, and an article made therefrom will possess the toughness and wearing qualities of new rubber. This improvement is particularly true when my process of devulcanizing by means of tar is used, for that introduces certain qualities into the rubber treated by the emulsoid colloid solution, for while the resins in rubber are generally subtracted by saponification during the older process of reclaiming, where caustic soda alone is used under steam pressure and the fiber is destroyed, articles made from material produced as above specified are better than if made from new rubber where they are to be subjected to heat, exposed to the elements, or to the action of oils, acids or alkalies. The cost is less performed with this process than with those processes where the fiber is destroyed and removed, or removed without being destroyed, while the yield is increased. By adding some of the cheaper gums, such as guayule, acra, pontianak, or rubber without fiber devulcanized by my process as cited, an article of a higher grade can be produced at a low cost.

I am aware that others have produced a colloidal cellulose in a somewhat similar manner or with acids, but no one has produced it with alkalies in combination with a devulcanizing process where an emulsoid colloid solution is used as a devulcanizing agent composed of tar, pitch, resin, gum or balsam as I use them or with a sulfur solvent, prior to my use of the same for which my patents were issued.

This can be made a two-stage process by first devulcanizing by my devulcanizing process, according to patents as cited, and then introducing the material into a combined solution of sodium hydroxide and carbon disulfide in the proportions mentioned. Or it may be used as a one-stage process by using the colloid solution and caustic soda as given in Patent No. 1,322,152, or with an increased amount of NaOH to produce the desired effect on the cellulose structure of the cotton fibre. In making material of this mass it may be advisable to use a calcium chloride on the material before the carbon disulfide is added which may be used in such quantities as experience will justify. The solvent can be recovered if desired. If the calcium chloride is used in the proportion of about 15% of the original weight of the dry rubber added, the resultant may be vulcanized for hard rubber and a white or a very light hard rubber produced. As regards the white hard rubber, for which there is such a great demand, it can be produced by using a white scrap and devulcanizing with rosin instead of tar, using the carbon disulfide as the sulfur solvent and the caustic soda at about 10% to 20% solution and adding a white filler and pigment to assist in making the product white.

What I claim as new and desire to secure by Letters Patent:

1. The process of devulcanizing vulcanized rubber in the presence of fiber which comprises devulcanizing the vulcanized rubber by boiling it with an emulsoid colloid solution to devulcanize the rubber and treating the fiber to make it combine in the form of a colloidal cellulose with the rubber to make a devulcanized rubber of superior quality and to increase the yield.

2. The process of devulcanizing vulcanized rubber in the presence of fiber which comprises devulcanizing the vulcanized rubber by boiling it with an emulsoid colloid solution to devulcanize the rubber and treating the fiber so that it will combine in the form of a colloidal cellulose with the rubber when sheeted out so as to make a devulcanized rubber of superior quality and to increase the yield.

3. The process of devulcanizing vulcanized rubber which comprises boiling the vulcanized rubber scrap intimately associated with fiber, with an emulsoid colloid solution to devulcanize the rubber treating the fiber with caustic soda and carbon disulfide to make a colloidal cellulose which can unite with the devulcanized rubber when both are sheeted out together.

4. The process of devulcanizing vulcanized rubber which comprises boiling vulcanized rubber scrap intimately associated with fiber with an emulsoid colloid solution to devulcanize the rubber, treating the fiber to make a colloidal cellulose and combining the treated fiber and devulcanized rubber to form a superior quality of devulcanized rubber.

5. The process of devulcanizing vulcanized rubber which comprises boiling vulcanized rubber scrap intimately associated with fiber with an emulsoid colloid solution to devulcanize the rubber, treating the fiber with caustic soda and carbon disulfide to make a colloidal cellulose and combining the treated fiber and devulcanized rubber by sheeting out the two together to form a product which appears to be all devulcanized rubber of a superior quality and greater yield.

6. The process of devulcanizing vulcanized rubber which comprises boiling vulcanized rubber scrap intimately associated with fiber with an emulsoid colloid solution to devulcanize the rubber, treating the fiber with a 10 to 20 per cent solution of sodium hydroxide and about one pound of carbon disulfide to each ten pounds of rubber scrap with the addition of water and the use of heat as described and specified, and then combining such treated fiber and devulcanized rubber to make a product of devulcanized rubber of superior quality.

7. The product obtained by devulcanizing vulcanized rubber scrap when the rubber is intimately associated with fiber where the rubber is devulcanized and the fiber treated with sodium hydroxide and carbon disulfide to make a colloidal cellulose and the two combined to make a devulcanized rubber of superior quality.

8. The product obtained by devulcanizing vulcanized rubber scrap when the rubber is intimately associated with fiber with an emulsoid colloid solution and treating the fiber with sodium hydroxide and carbon disulfide to make a colloidal cellulose, and combining the rubber so devulcanized and fiber so treated by sheeting the two together with a vulcanizing agent, accelerator, pigments, etc., and revulcanizing this compounded rubber to make a new product.

9. The product obtained by devulcanizing white vulcanized rubber scrap intimately associated with fiber with an emulsoid colloid solution, treating the fiber with a bleaching agent and with sodium hydroxide and carbon disulfide to form a colloidal cellulose and then combining the devulcanized rubber and colloidal cellulose with white pigments and vulcanizing agents and then vulcanizing this compounded white rubber to form a white hard rubber product.

CYRUS FIELD WILLARD.